March 7, 1950        E. R. POULTON        2,500,138
ANGLE MEASURING INSTRUMENT
Filed Sept. 20, 1946        2 Sheets-Sheet 1
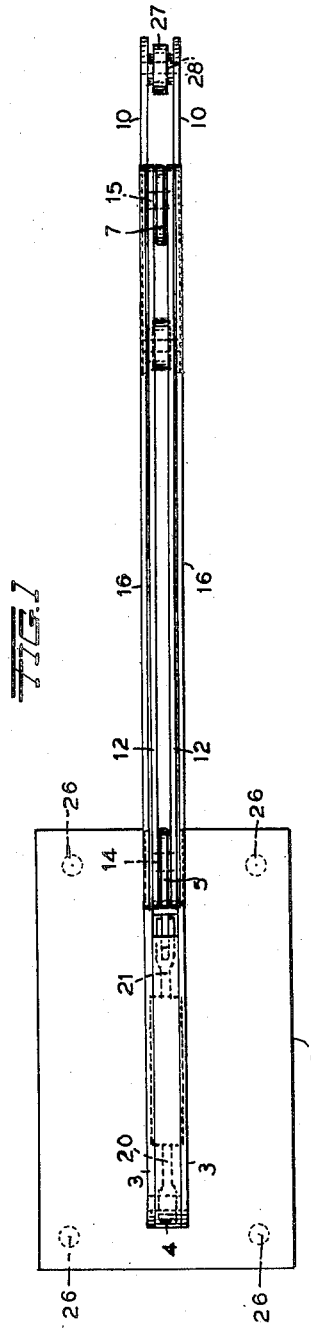
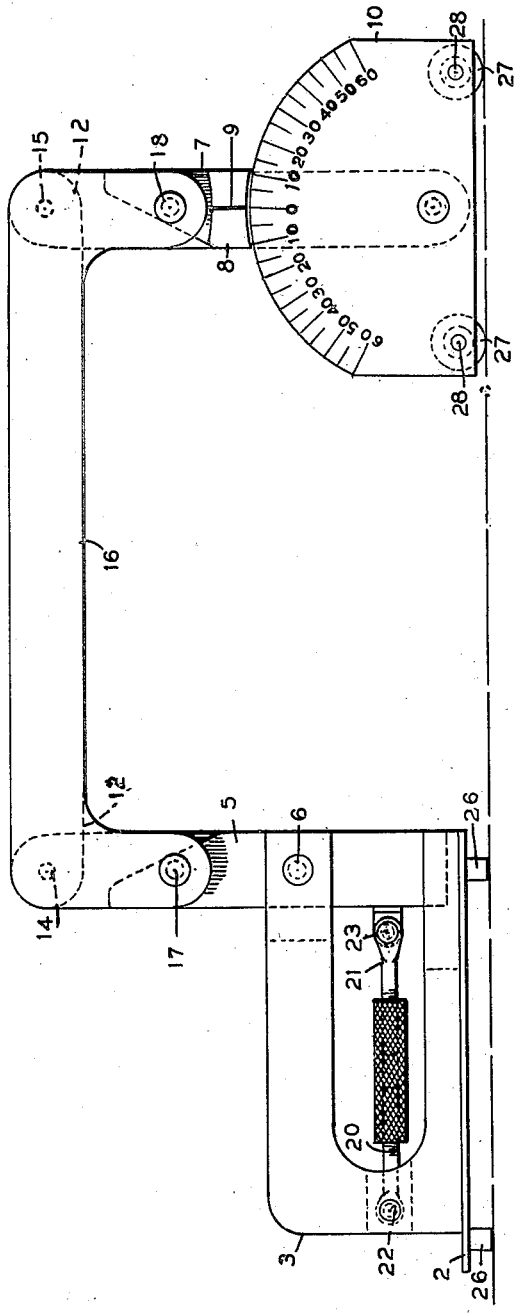
INVENTOR.
ERNEST R. POULTON
BY Edward M. Fisher March 7, 1950  E. R. POULTON  2,500,138
ANGLE MEASURING INSTRUMENT
Filed Sept. 20, 1946  2 Sheets-Sheet 2
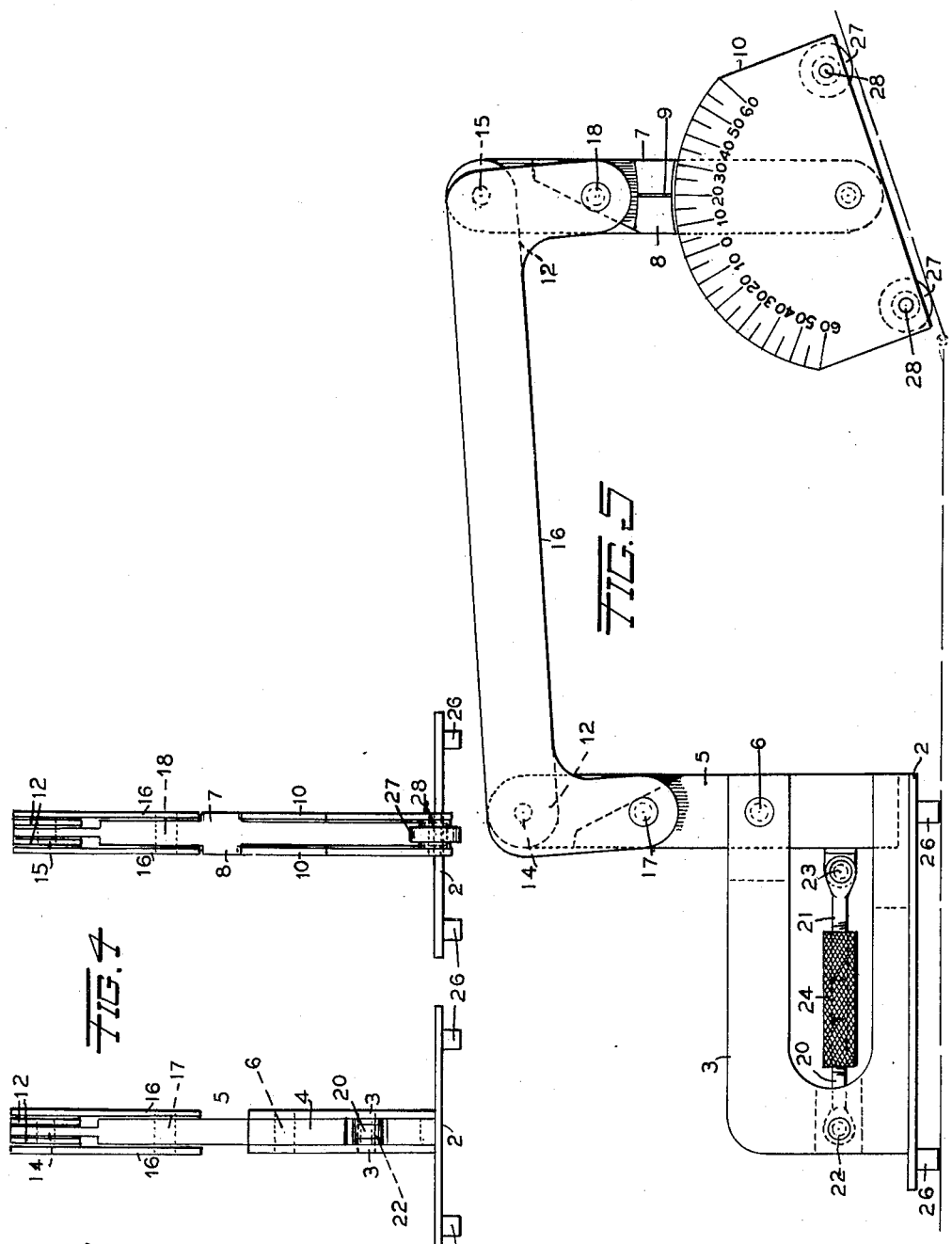
INVENTOR.
ERNEST R. POULTON
BY Edward M Fisher Patented Mar. 7, 1950

2,500,138

UNITED STATES PATENT OFFICE 2,500,138

ANGLE MEASURING INSTRUMENT

Ernest R. Poulton, Orlando, Fla., assignor to Wilma Poulton, Orlando, Fla.

Application September 20, 1946, Serial No. 698,289

2 Claims. (Cl. 33—174)

The present invention is concerned with the provision of an instrument by means of which angular horizontal and vertical displacements of aircraft control surfaces may be measured, and more particularly is considered as an improvement in the type of instrument shown and described in my co-pending application Ser. No. 628,113, filed November 13, 1945.

In rigging of aircraft it is essential that all control surfaces be adjusted for prescribed horizontal or vertical displacement thereof, therefore, the primary object of this invention is to provide an instrument for quick and accurate measurement of said displacements, said instrument comprising a base portion and dial mechanism, including a dial having angular degree scale visible thereon, in swivel engagement with said base member, and means for adjusting the dial pointer to a zero reading on said dial when the base is placed against a fixed surface such as the wing or fin, and the dial against a control surface in its neutral position and in a manner whereby, as the control surface is swung, the angular displacement thereof from its neutral position is registered on the dial.

Other and further objects will appear as the description proceeds.

The accompanying drawings show, for purpose of illustrating the present invention, an embodiment in which the invention may take form, it being understood that the drawings are illustrative of the invention rather than limiting the same.

In the drawings:

Figure 1 is a top plan view of an instrument embodying this invention.

Figure 2 is a side elevation thereof and illustrating the base and dial members in horizontal plane as to each other and the dial pointer accordingly set.

Figures 3 and 4 are base and dial end views, respectively.

Figure 5 is a side elevation similar to Figure 2 and illustrating for clearness of the invention a control surface displaced at an angle of twenty degrees.

This instrument includes a rectangular base plate 2; longitudinally central on the upper face thereof is a handle member in the form of oppositely disposed U-shaped plates 3 spaced by spacing block 4; lower legs of said plates on their under edge being in fixed engagement with the base, upper legs functioning as a support for a compensating post 5 which lies between the inner ends of same; is at right angles to the base 2; and is pivotly engaged as at the designated point 6.

Spaced from the post 5 and in parallel relation thereto is established a dial compensating post 7 substantially as shown in Figure 5 including opposite lateral projections 8 upon the outer faces of which are dial pointer markings 9.

In pivotal engagement with said post 7, upon its inner end and in parallel relation to the opposite sides thereof are dial plates 10; each of which has on its outer face a visible angular scale, this dual dial structure permitting easy reading thereof irrespective of the position of the instrument.

The base compensating post 5 and dial compensating post 7 are in pivotal jointure at the respective ends opposite the base 2 and dial plates 10 by means of link members 12, as designated at 14 and 15.

To accurately indicate upon the dials the measurement of the angular horizontal or vertical displacement of the control surface as to the specified neutral position thereof in relation to the plane of the base, an aligned parallel attitude must be maintained between the base compensating post 5 and the dial compensating post 7, therefore, there are provided as a part of this invention compensating link members 16 which are in pivotal jointure, 17 and 18, with said posts 5 and 7, respectively, substantially midway thereof in respect to their opposite ends. As shown in the drawings said compensating link members are arched, however this is not to be considered as a limitation as the direct value of the arching is to permit measuring of balanced control surfaces and wherein clearance must be provided for the upswing of the balance portion of the control surface, otherwise said link may be a straight connection between the pivotal points.

Use of this instrument calls for first placing the control surface to be measured in the prescribed neutral position, the base member is then placed against a fixed surface adjoining said control surface or with which same is in pivotal engagement and manually holding same in place by use of a handle formed with said base and the dial is placed against the control surface, however, the prescribed neutral position of the control surface is not always in a true horizontal or vertical position as to the fixed surface, and, the function of this instrument being to measure the angular displacement of the control surface as to its prescribed neutral position it is necessary to adjust the dial pointer marking 9 to the existing common attitude of the control surface to the fixed surface which means an adjustment of the dial pointer 9 to the common point, zero, on the dial.

Dial pointer adjustment is thru means of mechanism within the open space of the handle portion of the base 2 and comprises rods 20 and 21 the outer ends thereof being in pivotal engagement with said handle and base compensating post 5 as designated at 22 and 23, respectively, inner ends having left and right hand threads, and coupled by a turnbuckle 24 so threaded that when same is turned the extended over all length of said rods is extended or retracted which in turn causes a lateral movement of the base compensating post 5 on the pivotal point 6 which movement is communicated to the dial pointer thru link members 12 and 16 and dial compensating post 7, which carries the dial pointer, and is laterally rotated as respect to said dial post, during the period of adjustment, from pivot point 13.

To compensate for airfoil curvature, rivet heads, overlaps and the like and to prevent slippage of the base 2 there are provided pads 26 at each corner of the underside of said base, and to readily fit the dial to the control surfaces over curvatures and the like I provide rollers 27 rotatable on axis 28 which terminate in opposite footings of the dial plates.

Obviously, my invention is susceptible of embodiment in forms other than that illustrated in the accompanying drawings, and I therefore consider as my own all modifications and adaptations of the form of the instrument herein disclosed, which fairly fall within the scope of the appended claims.

What is claimed is:

1. An instrument of the kind described, comprising a portable flat bottom base adapted to be unattached and freely movable to a point of rest upon a foundation, a dial separated from the base and disposed in spaced relation thereto for frontal upstanding substantially right angular position with respect the bottom of such base, an angular degree scale visibly carried by the dial for full view when the latter is in frontal position engaged with work, a support having an end pivoted to the dial centrally with respect to the scale, a second support singly pivoted to the base, an adjustable linkage system having pivotal connections with the supports, respectively, for sustaining these in parallelism to each other on adjustment of said system, a pointer on the first named support for coaction with the scale, and manually adjustable means connected to the base and the second support for regulating the system and supports to alter the relationship of such base and dial with respect to each other.

2. An instrument of the kind described, comprising a base adapted to be unattached and freely movable upon a foundation, a dial separated from the base and disposed in spaced relation thereto for engaging work in frontal outstanding substantially right angular position to such work and base, an angular degree scale visibly carried by the dial for full view when the latter is in frontal engaged position with work, a support having an end pivoted to the dial centrally with respect to the scale, a second support singly pivoted to the base, an adjustable linkage between and pivotally connected to the said supports, respectively, for sustaining these in parallelism to each other on adjustment of the linkage, base or dial, a pointer on the first named support for coaction with the scale, adjusting means connected to the base and second support for regulating the linkage and supports to alter the relation of such base and dial with respect to each other, and movable contacts on the dial to traverse work engaged thereby.

ERNEST R. POULTON.

REFERENCES CITED

The following references are of record in the file of this patent:

UNITED STATES PATENTS

| Number | Name | Date |
|---|---|---|
| 747,522 | Wilkes | Dec. 22, 1903 |
| 1,380,945 | Brown | June 7, 1921 |
| 1,633,628 | Fortin | June 28, 1927 |
| 1,933,855 | Alexander | Nov. 7, 1933 |
| 2,000,281 | Godfrey | May 7, 1935 |
| 2,136,140 | Langsner | Nov. 8, 1938 |